United States Patent [19]

Hagiwara

[11] 4,433,866

[45] Feb. 28, 1984

[54] STRUCTURE FOR MOUNTING FUNCTIONAL PARTS ON A CLOSABLE MEMBER OF A VEHICLE

[75] Inventor: Taro Hagiwara, Yokohama, Japan

[73] Assignee: Nissan Motor Co., Ltd., Yokohama, Japan

[21] Appl. No.: 254,789

[22] Filed: Apr. 16, 1981

[30] Foreign Application Priority Data

Apr. 17, 1980 [JP] Japan .................................. 55-49534

[51] Int. Cl.³ ...................... B62D 25/12; B62D 27/00
[52] U.S. Cl. ........................................ 296/76; 296/82;
296/146; 296/185; 296/187; 296/92
[58] Field of Search .................. 296/76, 82, 146, 1 R,
296/1 C, 185, 187, 188; 49/381

[56] References Cited

U.S. PATENT DOCUMENTS 3,343,303  9/1967  Wanlass ................................ 296/76
3,525,687  8/1970  Ross et al. ............................. 296/76

Primary Examiner—Richard A. Bertsch

[57] ABSTRACT

A structure is disclosed which mounts functional parts (2, 2L, 2H), e.g. a lock device, hinge device, etc., on a closable member (1) of a vehicle, e.g. a back door, engine hood, etc. The closable member consists of a sheet material and is formed with an emboss (34, 34L, 34H) which is recessed from the general surface (32) of the closable member (1) toward the rear side thereof. A reinforcing member (4, 4L, 4H) is adhered to the outer surface of the emboss, and the functional parts are mounted on the rear surface of the emboss. The emboss and the reinforcing member are covered by a cover member (42, 42L, 42H) which is coplaner with the general surface (32) of the closable member (1), and are not visible from outside. The cover member consists of a finisher (42) or an extension (46) of a back door window glass whose rear surface is locally applied with a painted masking layer (47).

7 Claims, 14 Drawing Figures

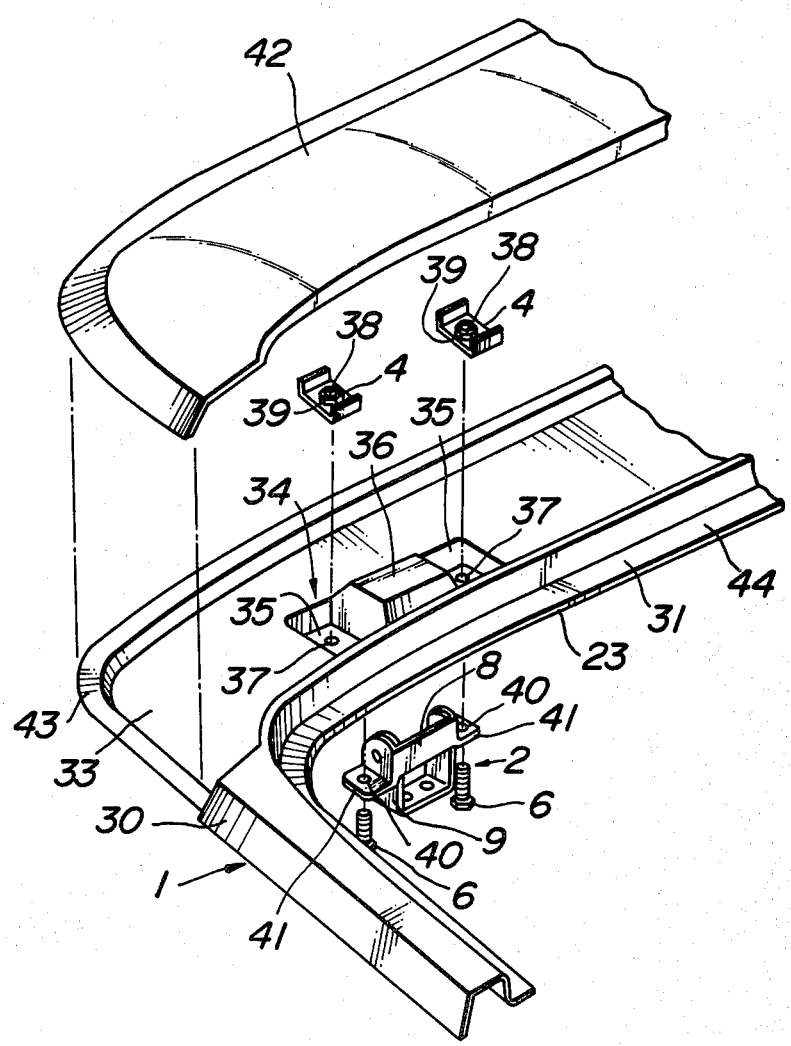

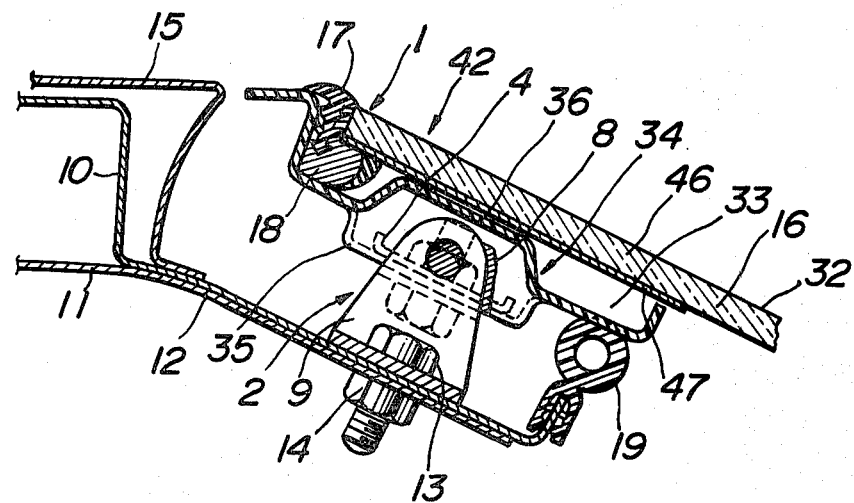
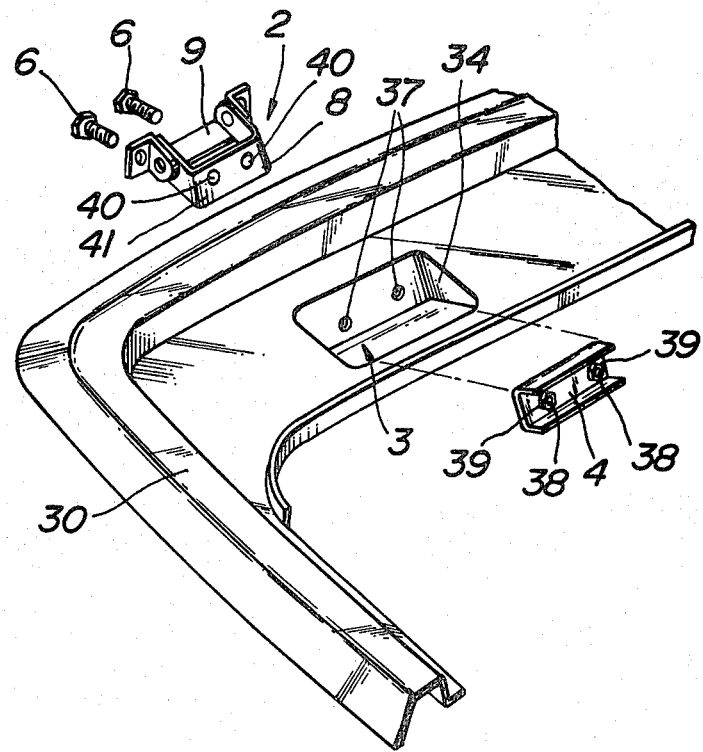

STRUCTURE FOR MOUNTING FUNCTIONAL PARTS ON A CLOSABLE MEMBER OF A VEHICLE

BACKGROUND OF THE INVENTION

1. Field of the Invention

The present invention relates to a structure for mounting functional parts on a closable member of a vehicle, such as an engine hood, back door and the like, the functional parts being associated with the closable member and consisting, for example, of locking device, hinge means, etc.

2. Description of Prior Art

Conventional structure is shown in FIGS. 1 and 2, which is to mount functional parts consisting of a hinge device onto a closable member of a vehicle in the form of a back door. The back door 1, for example, comprises a back door panel 30 consisting of a plastics sheet which is molded into shape. The hinge device 2 is mounted at a predetermined location 3, i.e. at the upper rear surface of the back door panel. At this location 3, a channel-shaped reinforcing member 4 is secured to the back door panel 30 by an adhesive layer 5 therebetween. Bolt 6 and nut 7 serve to mount on the reinforcing member 4 a movable hinge bracket 8 of the hinge device 2 which further includes a stationary hinge bracket 9. An outer and an inner roof rail panels 10, 11 are joined together to form a drip portion 12 to whose bottom wall the stationary hinge bracket 9 is mounted by bolt 13 and nut 14. In FIG. 2, there are further shown a roof panel 15, a back window glass 16, a molding 17 along the glass 16, adhesive material 18 for adhering the glass 16 on the panel 30, and a weather strip 19 mounted along the rear edge of the drip portion 12.

A similar conventional structure is shown in FIGS. 3A and 3B, which is to mount functional parts consisting of a lock device 2 on the back door 1. In this case, a channel-shaped reinforcing membr 4 is secured to the lower rear surface of the back door panel 30 by an adhesive layer 5, and a latch mechanism 20 forming part of the lock device 2 is secured to the reinforcing member 4 by bolt 6 and nut 7. Corresponding to the latch mechanism 20, a striker 21 is mounted on the upper periphery 23 of an opening for the back door, which is formed in a rear panel 23 of a vehicle body. The back door is further provided with a key cylinder 24 near the latch mechanism.

In the abovementioned conventional structures, even when the desired functional parts 2 are rigidly secured to the reinforcing member 4, the latter is secured to the rear surface 3 of the closable member by the adhesive material 5 only, so that overall supporting rigidity for the functional parts depends solely on the adhesive strength. In other words, the reinforcing member 4 having a small surface area to be applied with adhesive material cannot provide a sufficient supporting rigidity for the functional parts, regardless of its reinforcing rigidity.

The conventional structure further encounters the following disadvantage during the factory production. Namely, at the time when the closable member 1 is mounted on the vehicle body, the reinforcing member 4 to which the functional parts 2 are mounted has already to be firmly connected to the member 1. Thus, in order to improve the workability, heat-hardening type adhesive material having a high hardening speed is often used to establish the connection between the closable member 1 and the functional parts 2. However, such a type of adhesive material requires heating step to be carried out before the assembly of the vehicle body, by which the production process cannot readily be simplified.

SUMMARY OF THE INVENTION

Accordingly, it is an object of the present invention to provide an improved parts mounting structure, by which a sufficient supporting rigidity for the functional parts can be obtained without being affected by the adhesive strength of the reinforcing member.

To achieve the object, according to the present invention, there is provided a structure for mounting functional parts on a closable member of a vehicle, wherein the closable member consists of a sheet material and has a predetermined location to mount thereon the functional parts and provided with a reinforcing member, said location being defined by an emboss which is recessed from the general surface of the closable member toward the rear side thereof, the reinforcing member being provided on the outer surface of the emboss while the functional parts being mounted on the rear surface of the emboss, the closable member on the outer surface side of the emboss being provided with a cover member which completely covers the emboss and is coplaner with the general surface of the closable member.

With the above arrangement, the predetermined location of the closable member is sufficiently reinforced by the reinforcing member and provides a required supporting rigidity for the functional parts even when the reinforcing member is not yet completely adhered to the outer surface of the emboss. Thus, it is not necessary to wait mounting operation of the functional parts until completion of hardening of adhesive material for mounting the reinforcing member on the closable member, and the adhesive strength of the reinforcing member never affects the supporting rigidity of the functional parts. This avoids the necessity of the heating step to accelerate the hardening of the adhesive material, and serves to simplify of the production process. Moreover, the emboss and the reinforcing member on the outer surface thereof are completely covered by a cover member and not visible from outside so that the appearance is not impaired.

The present invention will now be described in detail, by way of example, with reference to some preferred embodiments shown in the accompanying drawings. Throughout the figures, like parts are designated by like reference numerals.

BRIEF DESCRIPTION OF THE DRAWINGS

FIG. 4 is a perspective view showing a first embodiment of the present invention, in which a hinge device is mounted on the back door panel;

FIG. 8 is a sectional view showing a third embodiment of the present invention, in which a hinge device is mounted on the back door panel and the window glass covers the reinforcing member and emboss therefor;

FIG. 9 is a perspective view showing the modification of the structure of FIG. 8;

DETAILED DESCRIPTION OF THE PREFERRED EMBODIMENTS

Figure 1:
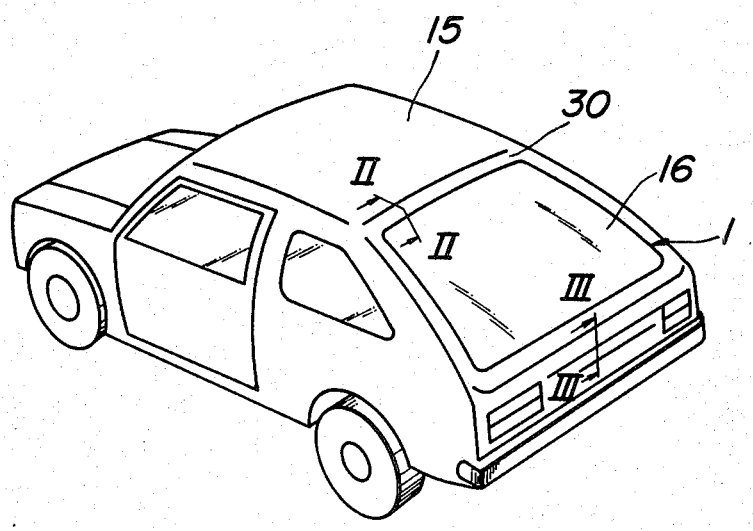
FIG. 1 is a perspective view of a vehicle having a back door to which the present invention is applied.
Figure 2:
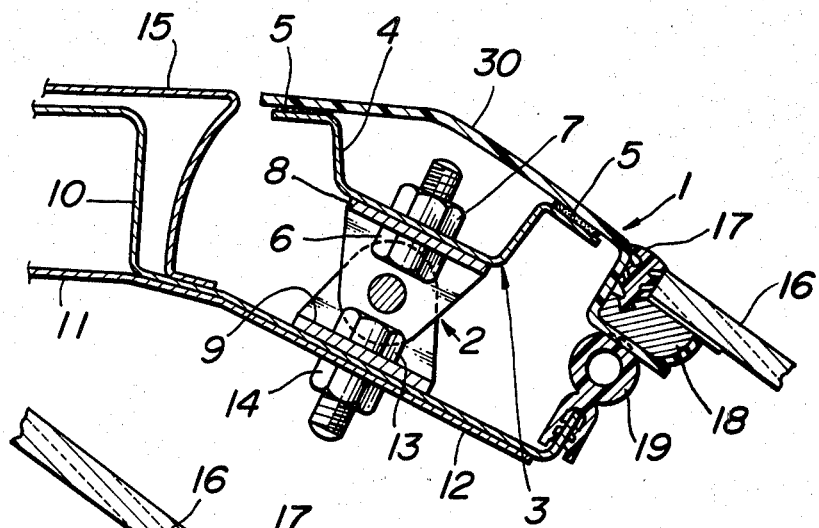
FIG. 2 is a sectional view taken substantially along the line II—II in FIG. 1, showing the abovementioned conventional structure for mounting a hinge device on the back door.
Figure 3A:
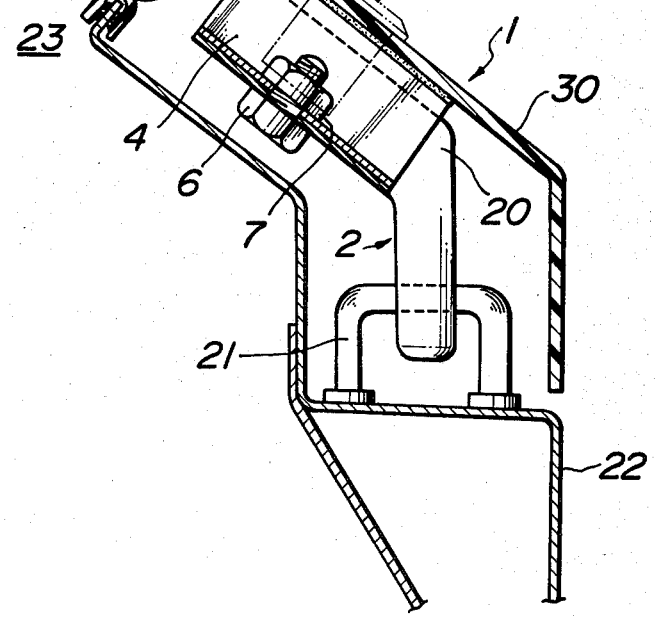
FIG. 3A is a sectional view taken substantially along the line III—III in FIG. 1, showing the abovementioned conventional structure for mounting a lock device on the back door.
Figure 3B:
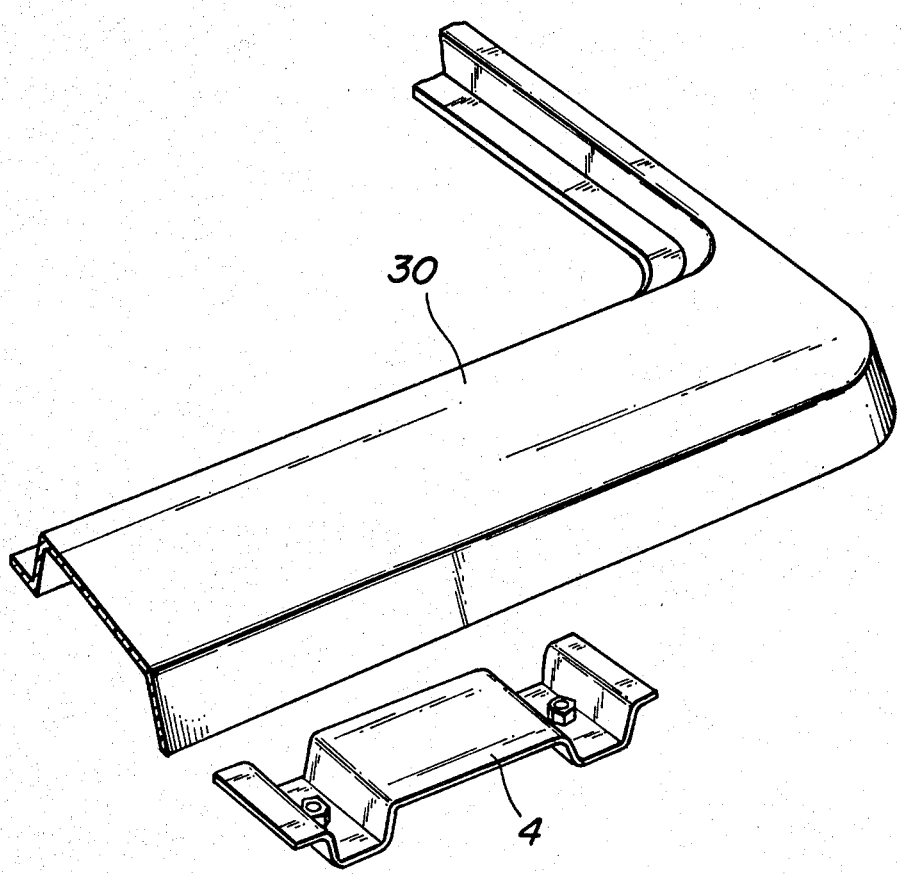
FIG. 3B is a perspective view showing pat of the back door panel and the reinforcing member in the structure of FIG. 3A.
Figure 5:
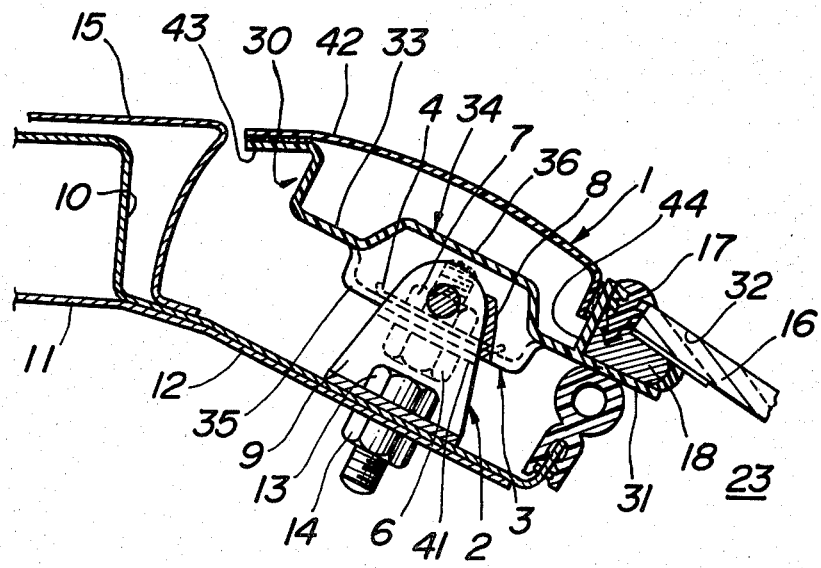
FIG. 5 is a sectional view which is similar to FIG. 2, showing the structure of FIG. 4.

Referring now to FIGS. 4 and 5, there is shown a first embodiment of the present invention, which is to mount on a back door 1 a hinge device 2. The back door 1, per se, is substantially the same as that shown in FIG. 2, and comprises a back door panel 30 which consists of a sheet material formed into the desired shape. This back door panel has an opening 23 whose periphery is formed as a flange 31 to mount thereon the back door window glass 16 by means of adhesive material 18 therebetween.

According to the present embodiment, the upper portion of the back door panel 30 is recessed from the general outer surface 32 of the back door 1, to protrude inwardly toward the rear surface side. Thus formed recess 33 provides at its both sides the locations 3 where the hinge device 2 are mounted. Each location 3 is in the form of an emboss 34 having a shape corresponding to that of the hinge device 2. More particularly, the emboss 34 has a pair of depressed portions 35, 35 which are spaced from each other widthwise, and a central projection 36 between the depressed portions 35, 35, which protrudes outwardly of the general surface of the recess 33 without projecting beyond the general surface 32 of the back door 1. The depressed portions 35, 35 are formed with bolt holes 37, 37, respectively. On the outer surface side of the emboss 34, reinforcing members 4, 4 are adhered to the bottom surface of the depressed portions 35, 35. Each reinforcing member 4 consists of a plate having upwardly bent end portions, and is formed with a bolt hole 38 corresponding to the bolt hole 37 in the depressed portion 35. A nut 38 aligned with the bolt hole 37 is welded to the outer side surface of the reinforcing member 4.

As shown in FIG. 4, the hinge device 2 in this embodiment comprises a stationary hinge bracket 9 having a substantially U-shaped section, and a movable hinge bracket 8 pivotally supported by both legs of the hinge bracket 9. More particularly, the movable hinge bracket 8 includes a central portion which bridges the legs of the stationary hinge bracket 9, a pair of vertical portions on both sides of the central portion, which are in contact with the outer surfaces of the legs, respectively, and a pair of horizontal portions 41, 41 projecting laterally outwards from the vertical portions and formed with bolt holes 40, 40, respectively.

To mount the hinge device 2 on the rear surface side of the emboss 34 in the back door panel 30, the horizontal portions 41, 41 of the moveable hinge bracket 8 are brought into contact with the rear surfaces of the depressed portions 35, 35 of the emboss 34. By this, portions of the hinge device 2 which protrudes upwards from the horizontal portions 41 are accommodated within the space defined by the central projection 36 of the emboss 34. In this condition, bolts 6, 6 are passed through the holes 40, 40; 37, 37; 38, 38 and threaded into the nuts 39, 39, so that the hinge device 2 is mounted on the back door panel 30 at the horizontal portions 41, 41 of the moveable hinge bracket 8. Subsequently, as shown in FIG. 5, the stationary hinge bracket 9 is connected to the drip portion 12 formed by the outer and inner roof rail panels 11, 12, by means of bolts 13 and nuts 14.

The outer surface side of the recess 33 in the back door panel 30 is completely covered by a finisher 42 which is adhered to an upper peripheral flange 43 of the panel 30, and to a vertical wall 44 formed along the upper edge of the opening 23 for the window glass 16, in a manner such that the general surface of the finisher 42 is coplaner with the general surface 32 of the back door 1.

With the abovementioned structure, the hinge device 2 is mounted on that location which is reinforced by the reinforcing member 4 so that a sufficient supporting rigidity for the hinge device can be obtained. While the reinforcing member 4 is secured to the bottom surface of the depressed portion 35 by adhesive material, the hinge device 2 can be mounted in position before the completion of hardening of the adhesive material. Namely, the reinforcing member 4 at the time of mounting the hinge device 2 is clamped between the bottom surface of the depressed portion 35 and the nut 39 with which the bolt 6 engages and is thus prevented from dislocation. Furthermore, the finisher 42 completely covers the recess 33 of the panel 30 and visually shields the reinforcing member 4 from outside to thereby provide a refined appearance.

Figure 6:
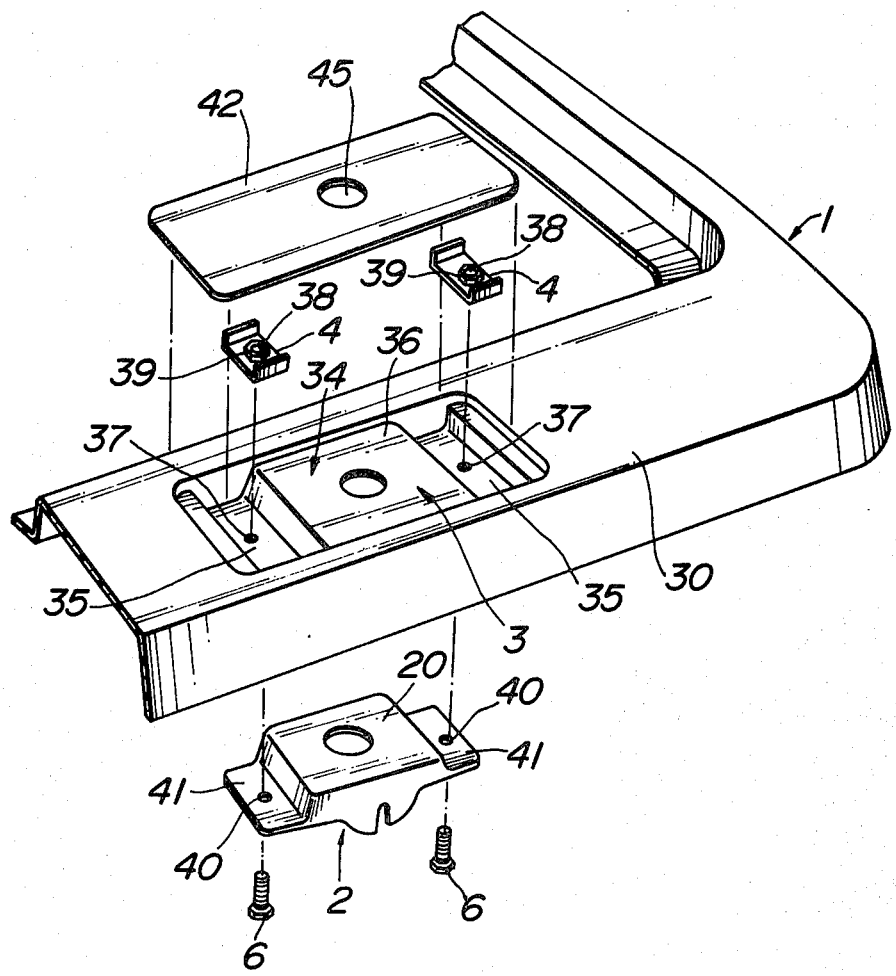
FIG. 6 is a perspective view showing a second embodiment of the present invention, in which a lock device is mounted on the back door panel.
Figure 7:
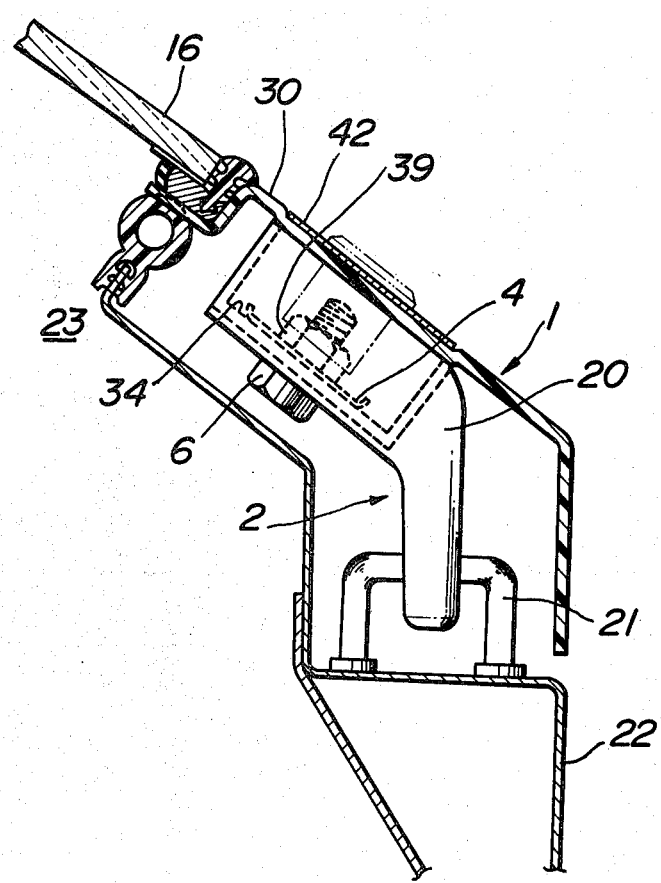
FIG. 7 is a sectional view which is similar to FIG. 3, showing the structure of FIG. 6.

A second embodiment of the present invention is shown in FIGS. 6 and 7, by which a lock device 2 is mounted on the back door 1. As in the first embodiment, the back door panel 30 has a predetermined location 3 at the lower center portion thereof, which is in the form of an emboss 34 having a shape corresponding to that of the latch mechanism 20 of the lock device 2. Referring to FIG. 6, the latch mechanism 20 has a central portion which projects upwards, i.e. toward the panel 30, and a pair of flat mounting portions 41, 41 on both sides of the central projection. Correspondingly, the emboss 34 includes a pair of depressed portions 35, 35 which are spaced from each other and recessed toward the rear surface of the panel 30, and a central portion 36 between the depressed portions 35, 35 which is inwards of the general surface 32 of the panel 30. Reinforcing members 4, 4 consisting of sheet material shaped into a desired cross-section are adhered to the bottom surface of the depressed portions 35, 35 on the outer side of the panel 30. In this condition, the latch mechanism 20 is brought into contact with the rear surface of the emboss 34. Namely, the mounting portions 41, 41 of the mechanism 20 are superimposed with the rear side surface of the depressed portions 35, 35. Bolt holes 40, 40 formed in the mounting portions 41, 41, bolt holes 37, 37 formed in the bottom walls of the depressed portions 35, 35, as well as bolt holes 38, 38 formed in the reinforcing members 4, 4 are aligned with each other. Bolts 6, 6 are passed through the holes 40, 40; 37, 37; 38, 38 and threaded into nuts 39, 39 which are welded to the reinforcing members 4, 4 on outer side thereof. By this, the latch mechanism 20 can be mounted in position with a sufficient supporting rigidity.

On the outer surface side of the back door panel 30, the emboss 34 and the reinforcing member 4, 4 are completely covered by a finisher 42 having an outer surface which is coplaner with the general surface 32 of the back door 1. The finisher 42 may be adhered in position. As shown in FIG. 6, the finisher 42, the central projection 36 of the emboss 34 as well as the central portion of the latch mechanism 20 are formed with through holes 45, respectively, to mount therein a key cylinder, not shown. Further, as shown in FIG. 7, the rear panel 22 of the vehicle body is provided with a striker 21 which engages with the latch mechanism 20.

Consequently, according to this embodiment also, the desired location 3 of the back door panel 30 is reinforced by the members 4, 4 which provide sufficient supporting rigidity for the latch mechanism 20, and the appearance is not impaired by the reinforcing members 4, 4 mounted on the outer surface side of the panel 30, as they are covered by the finisher 42 and not visible from outside.

FIG. 8 shows a third embodiment of the present invention, which is similar to that shown in FIGS. 4 and 5. The difference resides in that, instead of mounting a separate finisher, the upper edge of the window glass 16 is extended toward the upper edge of the back door panel 30 such that the upper extension 42 of the glass 16 covers the emboss 34 for mounting the hinge device 2. On the inner surface of the extension 42, the glass 16 is applied with painted masking layer 47 to visually shield the emboss 34 and the hinge device 2. As a seperate finisher can be dispensed with, the production process can be further simplified.

Figure 10:
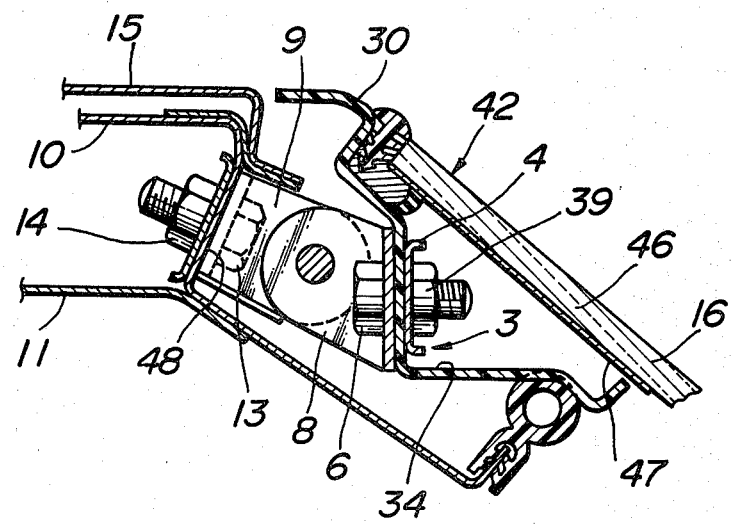
FIG. 10 is a sectional view of the structure shown in FIG. 9.

FIGS. 9 and 10 show a modification of the third embodiment described above. In this instance, the stationary hinge bracket 9 of the hinge device 2 is secured to a vertical wall 48 of the roof rail outer panel 10 so that the mounting portion 41 of the moveable hinge bracket 8 is disposed substantially in parallel with the vertical wall 48. Accordingly, the location 3 at the upper portion of the back door 1, where the hinge device 2 is mounted, is formed with an emboss 34 having substantially inverted V-shaped cross-section with respect to the general surface 32 of the back door panel 30. The reinforcing member 4 is adhered to substantially vertical surface of the emboss 34.

Figure 11:
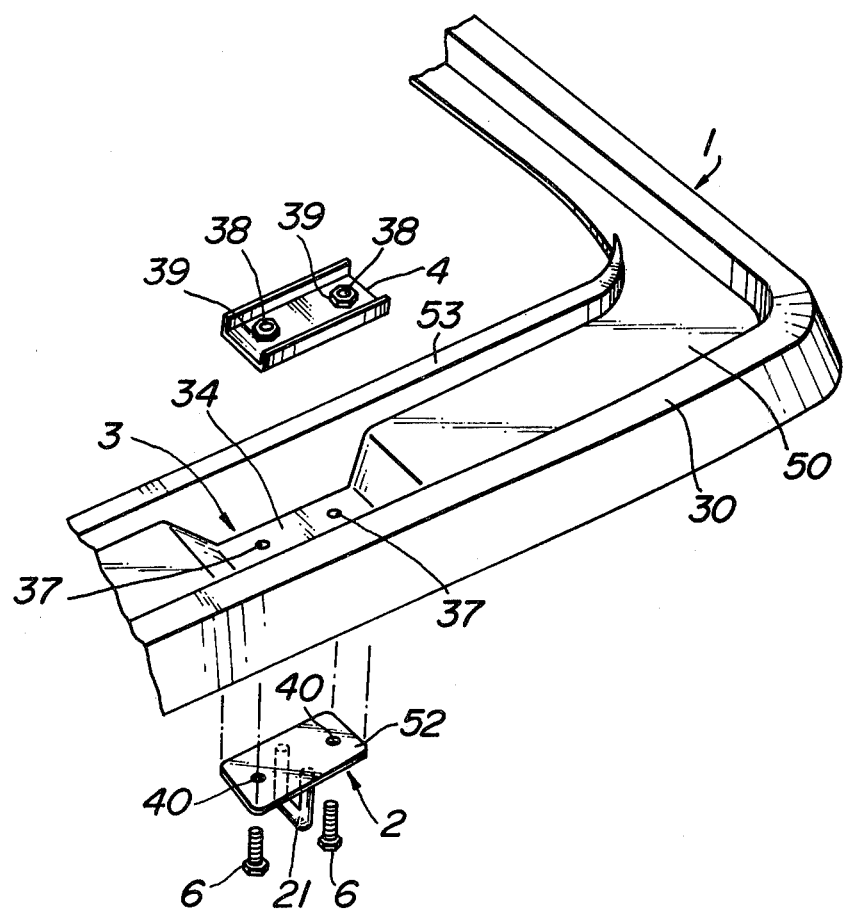
FIG. 11 is a perspective view showing a fourth embodiment of the present invention, in which the lock device is mounted on the back door panel.
Figure 12:
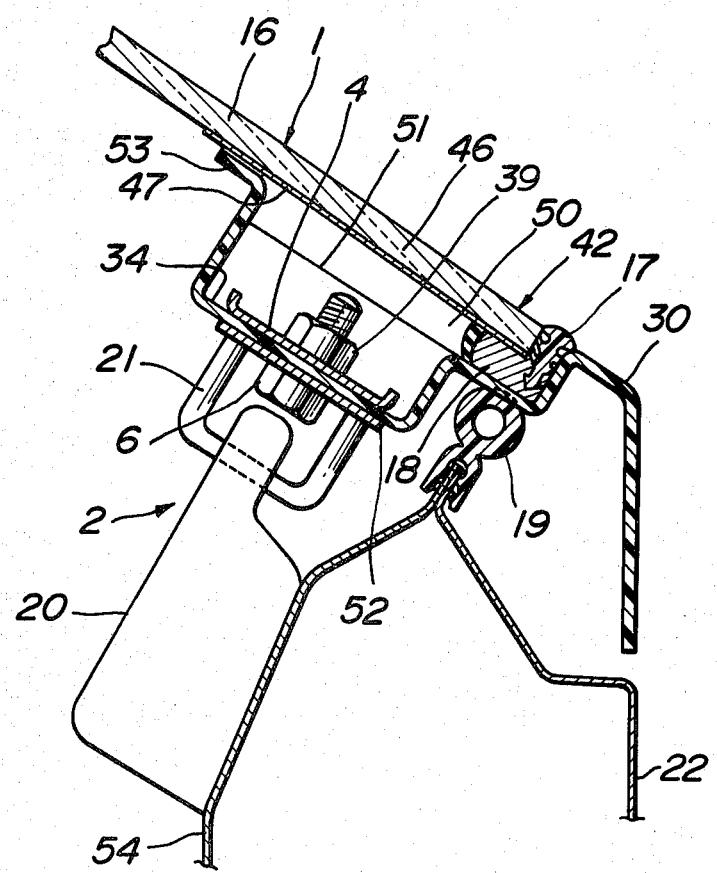
FIG. 12 is a sectional view of the structure shown in FIG. 11.

A fourth embodiment of the present invention is shown in FIGS. 11 and 12, which is to mount on the back door panel 30 a lock device 2. In this case, the lower portion of the back door panel 30 is formed as a recess 50. At the widthwise center location 3 of the recess 50, there is formed an emboss 34 to mount the striker 21 of the lock device 2, which is recessed toward the rear side of the back door panel 30 from the general surface 51 of the recess 50. A reinforcing member 4 having a nut 39 welded thereto is adhered, by adhesive material 5, to the outer surface of the emboss 34. The striker 21 has a base plate 52 which is brought into contact with the rear side surface of the emboss 34. Bolt holes 40 formed in the base plate 52, bolt holes 37 formed in the emboss 34, as well as bolt holes 38 formed in the reinforcing member 4 are aligned with each other, and bolts 6 are passed through the holes 40, 37, 38 and threaded into the nuts 39. By this, the striker 21 is mounted on the back door panel 30. As shown in FIG. 12, the back door window glass 16 has its lower end portion 4 extended toward the lower edge of the back door panel 30 and adhered thereto, in order to close the recess 50. By applying painted masking layer 47 on the rear side surface of the extended lower end portion 46, the window glass 16 serves as a cover 42 to visually shield the emboss 34 and the reinforcing member 4 from outside. The lower periphery of the window glass opening 23 in the back door panel 30 is formed as a support for the window glass. The rear panel 22 of the vehicle body is provided with a reinforcing member 54 on which the latch mechanism 20 corresponding to the striker 21 is mounted.

Figure 13:
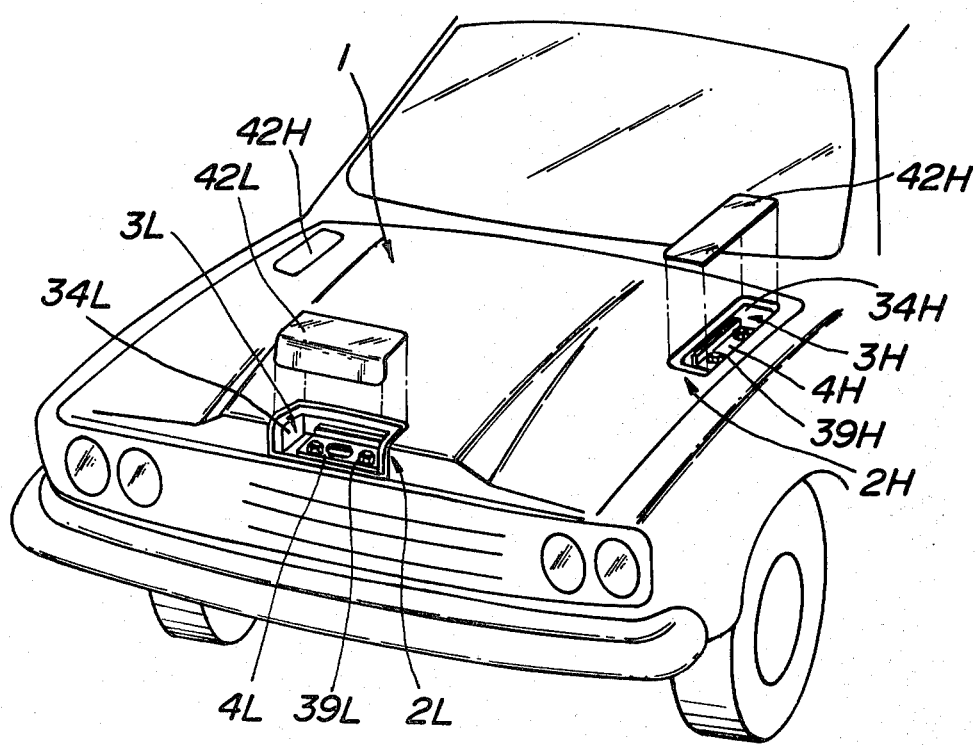
FIG. 13 is a perspective view showing a fifth embodiment of the present invention, in which hinge devices and a lock device are mounted on an engine hood.

FIG. 13 shows a fifth embodiment of the present invention, in which the closable member 1 consists of an engine hood. The hood 1 has at its front end a widthwise central location 3L to mount thereon the lock device 2L. This location 3L is in the form of an emboss 34L which is recessed toward the rear side of the hood 1 from the general surface 32 of the hood 1. A reinforcing member 34L is adhered to the outer surface side of the emboss 34L, which is completely covered by a cover 42L. Furthermore, the hood 1 has, on both sides of the rear end locations 3H to mount thereon the hinge devices 2H, respectively. As in the case of the location 3L, those locations 3H are also in the form of similar embosses 34H. Reinforcing members 4H are adhered to the outer side surface of the embosses 34H, and are covered by covers 42H.

In the abovementioned embodiments, the parts mounting structure according to the present invention is used to mount functional parts on the back door or the engine hood. However, the present invention can be applied to another type of closable member which may be a trunk lid or door on both sides of the vehicle body.

What is claimed is:

1. A structure for mounting functional parts on a closable member of a vehicle, wherein the closable member consists of a sheet material and has a predetermined location to mount thereon the functional parts and is provided with a reinforcing member, said location being defined by an emboss which is recessed from the general surface of the closable member toward the rear side thereof, the reinforcing member being provided on the outer surface of the emboss and the functional parts being mounted on the rear surface of the emboss, the closable member on the outer surface side of the emboss being provided with a cover member which completely covers the emboss and is coplaner with the general surface of the closable member, said reinforcing member being secured to the outer surface of the emboss by adhesive material, said functional parts being connected tightly with the reinforcing member by bolts and nuts, and said nuts being welded to one of the reinforcing member and the functional parts.

2. The structure as claimed in claim 1, wherein the functional parts consist of a hinge device.

3. The structure as claimed in claim 1, wherein the functional parts consist of a lock device.

4. The structure as claimed in claim 1, wherein the closable member is an engine hood.

5. The structure as claimed in claim 1, wherein the closable member is a back door.

6. The structure as claimed in claim 5, wherein the back door comprises a window glass and a back door panel having an opening for the window glass, the window glass having said cover member in the form of an extension extending beyond the periphery of the opening toward one end portion of the panel to cover the emboss and the reinforcing member adjacent to said one end portion of the panel, the window glass on the rear surface of the extension being applied with a painted masking layer to visually shield the emboss and the reinforcing member from outside.

7. The structure as claimed in claim 6, wherein the periphery of the opening for the window glass is defined by a portion of the back door panel, which supports one end of the extension of the window glass.

* * * * *